(12) United States Patent
Cho et al.

(10) Patent No.: US 6,502,792 B1
(45) Date of Patent: Jan. 7, 2003

(54) LCD MONITOR STAND HAVING A MULTISTAGE STRUCTURE

(75) Inventors: Chang-Ho Cho, Inchun (KR); Dae-Hyoun Byoun, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 57 days.

(21) Appl. No.: 09/593,003

(22) Filed: Jun. 13, 2000

(30) Foreign Application Priority Data

Oct. 26, 1999 (KR) ............................................ 99-46555
Oct. 26, 1999 (KR) ............................................ 99-46557

(51) Int. Cl.[7] ............................................. F16M 11/00
(52) U.S. Cl. .................... 248/121; 248/121.1; 248/917; 248/919; 248/922; 248/923
(58) Field of Search ......................... 248/278.1, 282.1, 248/280.11, 121, 121.1, 917, 919, 922, 923; 74/575, 577

(56) References Cited

U.S. PATENT DOCUMENTS

| | | | | |
|---|---|---|---|---|
| 5,335,142 A | * | 8/1994 | Anderson | 361/681 |
| 5,397,081 A | * | 3/1995 | Landry et al. | 248/346 |
| 5,775,180 A | * | 7/1998 | Parke | 76/85 |
| 5,799,372 A | * | 9/1998 | Brunner et al. | 16/342 |
| 6,010,111 A | * | 1/2000 | Cho | 248/923 |
| 6,019,332 A | * | 2/2000 | Sweere et al. | 248/284.1 |
| 6,024,335 A | * | 2/2000 | Min | 248/371 |
| D426,235 S | * | 6/2000 | Phirippidis et al. | D14/253 |
| 6,116,557 A | * | 9/2000 | Choy et al. | 248/286.1 |
| 6,134,103 A | * | 10/2000 | Ghanma | 361/681 |
| 6,231,021 B1 | * | 5/2001 | Hong | 248/371 |
| 6,268,997 B1 | * | 7/2001 | Hong | 361/681 |

FOREIGN PATENT DOCUMENTS

| | | |
|---|---|---|
| EP | 0795810 A2 | 9/1997 |
| JP | 10-222078 | 8/1998 |
| JP | 10-222079 | 8/1998 |
| KR | 97-20163 | 5/1997 |
| KR | 1998-028843 | 8/1998 |
| KR | 1998-066383 | 12/1998 |

* cited by examiner

Primary Examiner—Korie Chan
Assistant Examiner—Ingrid Weinhold
(74) Attorney, Agent, or Firm—Robert E. Bushnell, Esq.

(57) ABSTRACT

An LCD monitor stand having a multistage structure comprises a display unit displaying an image and having a receiving groove part formed at the lower portion of the back side thereof, a stand unit supporting said display unit and having a top stand and a bottom stand, and a hinge connector installed at both end portions of the stand unit which allows the unit to be opened and closed completely when the stand unit is rotated upward and downward, and also to be fixed and released at one step or more between complete opening and closure.

Accordingly, the LCD monitor stand having this multistage structure rotates a display unit upward and downward, stopping at each step of the multistage structure and obtaining the best suited view angle. It is also possible to hang the LCD monitor on the wall when the stand unit is folded completely, and it is not necessary to separate the stand unit from the display unit for shipping.

13 Claims, 10 Drawing Sheets

LCD MONITOR STAND HAVING A MULTISTAGE STRUCTURE

CLAIM OF PRIORITY

This application makes reference to, and claims all benefits accruing under 35 U.S.C. §119 from the inventor's two applications LCD MONITOR HAVING STAND both filed with the Korean Industrial Property Office on Oct. 26, 1999 and there duly assigned Serial No. 46555/1999 and 46557/1999.

BACKGROUND OF THE INVENTION

1. Field of the Invention

The present invention relates to a liquid crystal display monitor(LCD monitor) stand having a multistage structure, more particularly, an LCD monitor stand having a multistage structure wherein an angle of a display unit is easily adjusted to obtain the best suited view angle and the supporting space can be enlarged by enabling to extend a stand unit frontward and rearward.

2. Description of the Prior Art

An LCD monitor is a light receiving type display apparatus which the variation of optical properties such as double refraction, rotatory polarization, double color, and light-scattering of a liquid crystal cell is visually converted by the variation of a molecule arrangement by applying a voltage to a liquid crystal. An LCD monitor which has the advantages of small size, simplicity to carry, and saving electric power, is widely used for output apparatus such as a television set, a computer and a video camera.

FIG. 1 is a perspective view showing a structure of a conventional LCD monitor 10. As shown in FIG. 1, LCD monitor 10 comprises a liquid crystal panel 2 installed in a front case 1, and a display unit 5 having a main Printed Circuit Board (PCB) 4 installed in a rear case 3, connected to front case 1 and outputting a predetermined signal to liquid crystal panel 2.

LCD monitor 10 further comprises a stand unit 7 to which is connected a terminal 6 for signal and power cables transmitting an electric signal to main PCB 4 and a top stand interface 8 rotating display unit 5 right or left and upward or downward within the scope of a predetermined angle by a hinge connector 9 and a swiveling structure formed in stand unit 7.

As shown in FIG. 2, hinge connector 9 comprises a rotating bar 9a connected to the rear case, a rotating shaft 9b connected to an end portion of rotating bar 9a, and a bracket 9c connected to stand unit 7 and connected rotatably to rotating shaft 9b in an L shape.

Bracket 9c has a stopping hole 9d in the shape of a circular arc at the vertical part thereof. Bracket 9C also has an end stopper 9e in an L shape, connected to rotating shaft 9b, and inserted into a stopping hole 9d. Therefore, end stopper 9e runs between both ends of stopping hole 9d so that display unit 5 can be rotated upward and downward.

However, if the stopper is located at the middle of the stopping hole, the display unit is rotated downward and is not fixed, because of its own weight. Accordingly, only angles that resulted from both end portions of the stopping hole can be fixed, and it is not possible to select the best suited view angle from among various angles. Also, there is a problem in separating the stand unit from the display unit for packaging purposes.

In addition, LCD monitor 10 is characterized by a display contrast depending upon view direction when compared with general monitors, and an angle or location of such an LCD monitor needs to be set frequently in order to obtain the best-suited view angle. Accordingly, for stably rotating and moving display unit 5 within the scope of the predetermined viewing angles, stand unit 7 must have a comparatively large size. In order to support display unit 5 stably (which is progressively increasing in size because of the tendency to prefer large-sized monitors), stand unit 7 must also be made bigger, This causes it to need more space for installation, and consequently it increases in cost.

SUMMARY OF THE INVENTION

Accordingly, an object of the present invention is to provide an LCD monitor stand having a multistage structure wherein a display unit can be fixed at various angles and can provide the best suited view angle, and wherein it is possible to support stably a large-sized display unit for rotation.

To achieve the objects of the present invention, a multistage structure is provided for an LCD monitor stand, which comprises a display unit for displaying an image and has a receiving groove part formed at the rear and lower portion thereof, a stand unit having top and bottom stands and supporting the above mentioned display unit, and a hinge connector mounted at both end portions of the stand unit, allowing the unit to be opened and closed completely when the display unit is rotated upward and downward and also to be fixed and released by detents at one step or more between complete opening and closure. A user can easily rotate the display unit and fix it at various angle for obtaining the best-suited view angle.

According to the present invention, the above-mentioned hinge connector allows the device to receive the rear part of the stand unit into the receiving groove part of the display unit when it is closed, so that it is possible to hang the LCD monitor on a wall.

The above-mentioned hinge connector comprises a rotating bar connected to the above display unit, a rotating shaft connected to an end of the above rotating bar and having a stop bar and a stop circular plate, and a bracket which is connected rotatably to the rotating shaft at one side thereof, and has a circular arc groove and a blocking bar having a blocking protrusion.

The stop bar has a vertical part and a horizontal part at the lower portion of the vertical part. The vertical part is connected to the rotating shaft, and the horizontal part is inserted into the circular arc groove of the bracket, so that the rotating shaft can be rotated only between both end portions of the circular arc groove.

The above stop circular plate is connected to the rotating shaft and has at least one protruding cog protruded from the outer surface, which is engaged with the blocking protrusion of the blocking bar, so that the stop circular plate can be rotated within a predetermined angle.

A spring is installed under the above blocking bar and a push button at the upper part thereof. If the push button is pushed, the blocking bar will move downward and the protruding cog of the stop circular plate will be released, and the stop circular plate can be rotated. If the pushed push button is released, the blocking bar will be returned at the previous position by the spring and thus stop the rotation of the stop circular plate.

In addition, the stand unit further comprises a wire stand installed at the front and rear sides thereof, and defining a supporting space, enabling the device to be folded forward and backward.

The wire stand comprises a front wire stand extended forward and a rear wire stand extended rearward, which have a protuberance at an end portion thereof. The wire stand comprises further, at an upper portion thereof, a wire holder having a guide hole formed in the same direction as the extension. The protuberance is inserted into the guide hole of the wire holder so that the wire stand can be folded toward the front and the rear of the stand unit.

As stated above, an LCD monitor stand having a multistage structure according to the present invention has the advantage of rotating (upward and downward) a display unit stopped in each step of the multistage structure and thereby obtaining the best-suited view angle. It is also possible to hang the LCD monitor on the wall when it is folded completely, and it is not necessary to separate the stand unit from the display unit for packaging. A display unit can be stably supported by the smallest stand in the minimum space, and consequently it is possible to decrease the cost and space for the installation.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

DETAILED DESCRIPTION OF THE PRESENT INVENTION

Figure 1:
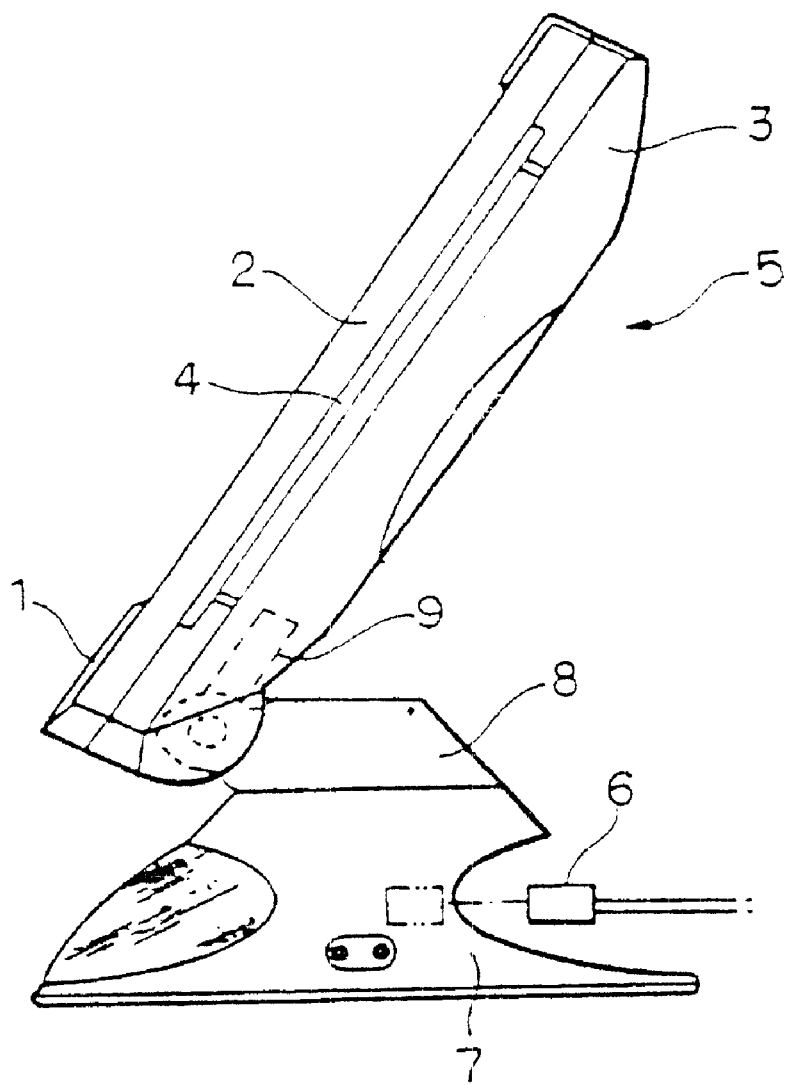
FIG. 1 is a side view illustrating a conventional LCD monitor.
Figure 2:
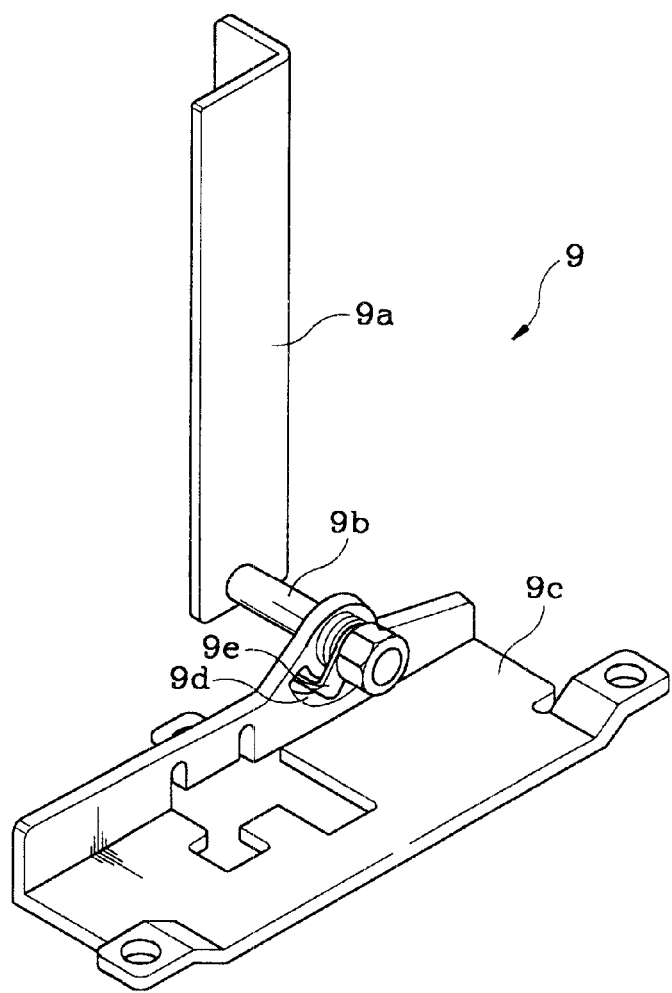
FIG. 2 is a perspective view illustrating a hinge connector of a conventional LCD monitor.
Figure 3:
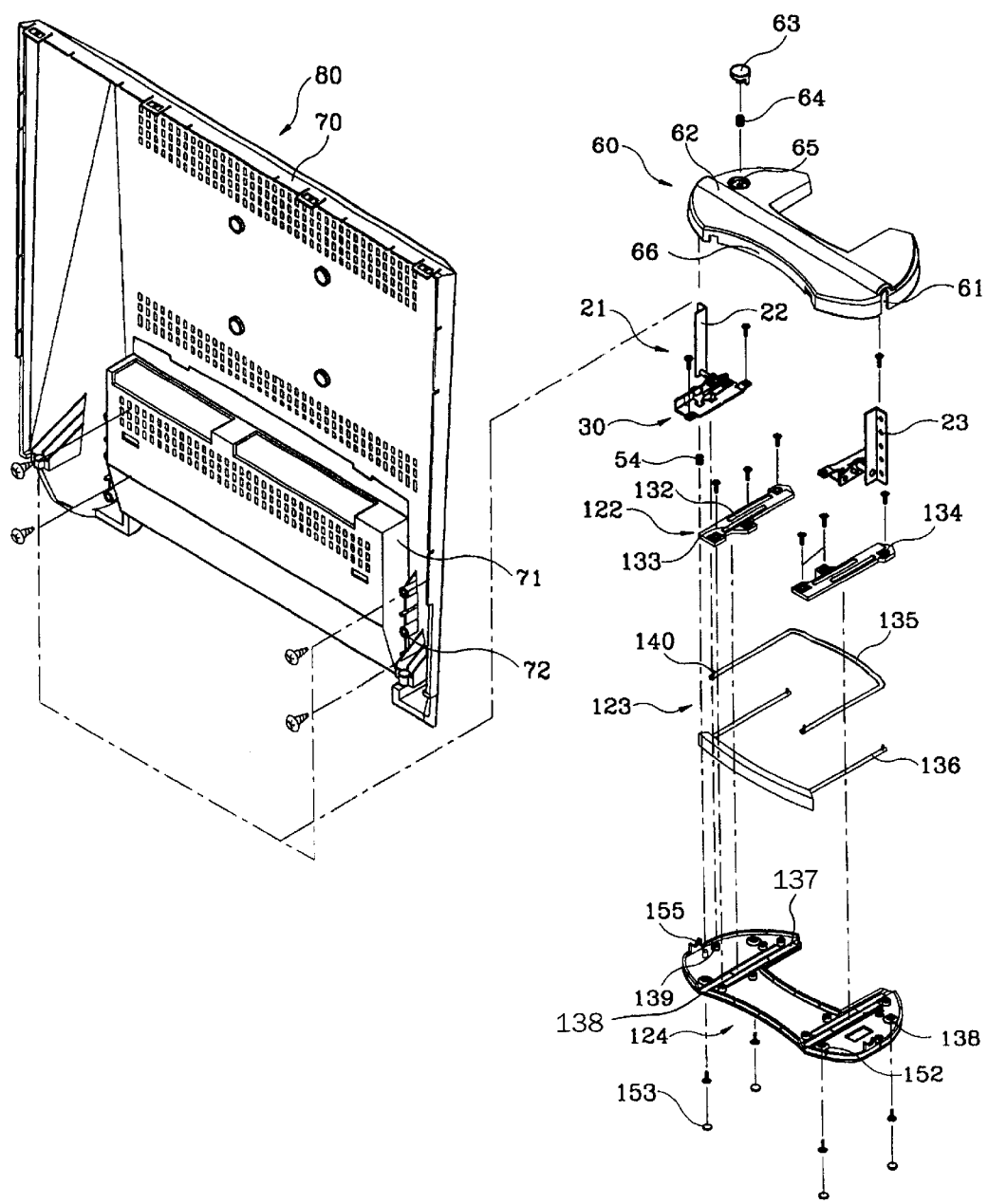
FIG. 3 is an exploded perspective view illustrating a multistage structure for an LCD monitor stand according to the present invention.
Figure 4:
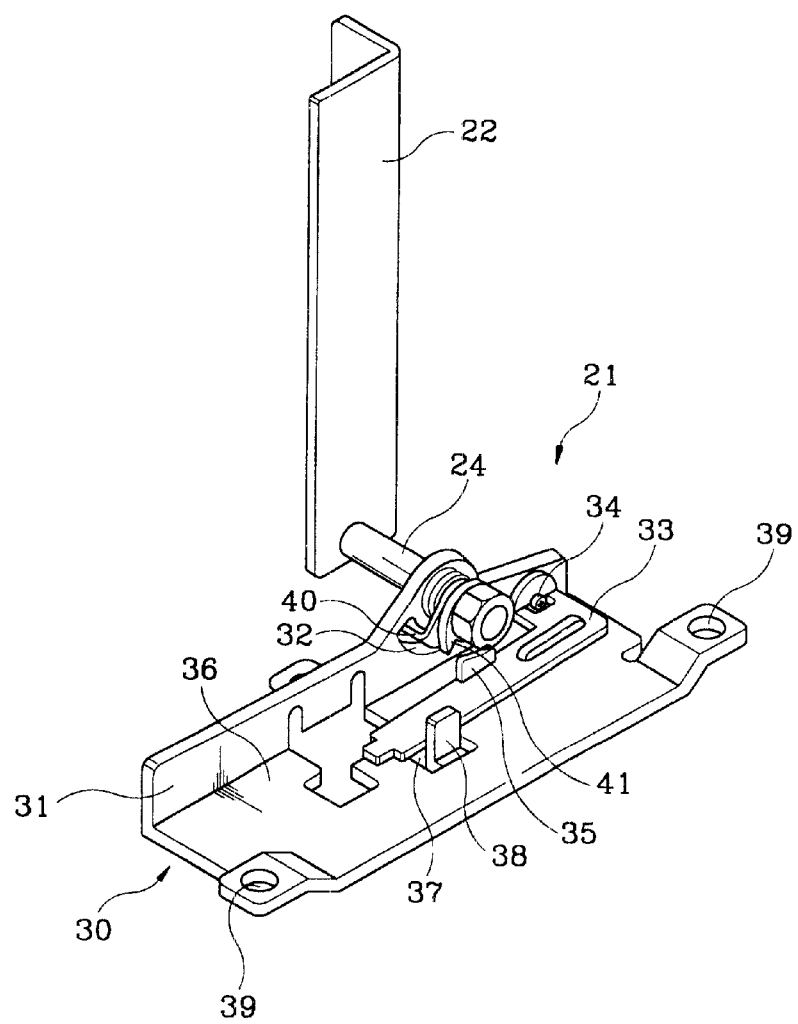
FIG. 4 is a perspective view illustrating a hinge connector for an LCD monitor according to the present invention.

Hereinafter, a preferred embodiment of the present invention will be described in details with reference to the accompanying drawings.

As shown in FIG. 3 to FIG. 7, an LCD monitor stand 20 comprises a hinge connector 21 fixed by screws to a rear case 70 having a receiving groove part formed at a lower part thereof. A wire holder 122 is located at one side of hinge connector 21, a wire stand 123 moving along wire holder 122. A bottom stand 124 supports a display unit from underneath the display unit, and a top stand 60 is connected to bottom stand 124 by a screw, as described hereinafter.

Rotating bar 22 having a cross section in an L-shape and a plurality of connecting holes 23 formed vertically at one side thereof is connected by a screw to a connecting boss 72 of rear case 70.

Bracket 30 is connected rotatably to rotating shaft 24 at the center of a vertical part 31 and has a stopping hole 32 under rotating shaft 24. Stopping hole 32 is preferably a circular arc hole having an angle of approximately 100°. Blocking bar 33 is connected rotatably to one side of a vertical part 31 by a hinge pin 34. Blocking protrusion 35 protruding vertically at the center of blocking bar 33 is located under a rotating shaft 24.

Inserting hole 37 is formed at the center of a horizontal part 36, and a guide bar 38 is protruded at a portion of an inserting hole 37, so that guide bar 38 can prevent blocking bar 33 from separating when rotated. A connecting hole 39 is formed at both ends of horizontal part 36 and connected to a bottom stand 124.

Rotating shaft 24 is connected integrally to rotating bar 22 at one end portion thereof and is connected rotatably to vertical part 31 of bracket 30 at the center portion thereof. Rotating shaft 24 is connected to a stop bar 40 and a stop circular plate 41 at an end portion thereof.

Figure 5:
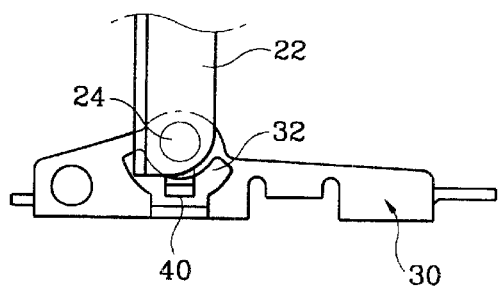
FIG. 5 is a left view illustrating a hinge connector for an LCD monitor according to the present invention.

A vertical portion of stop bar 40 having an L shape is connected to rotating shaft 24, and the horizontal portion thereof is inserted into stopping hole 32. Therefore, as shown in FIG. 5, stop bar 40 can rotate freely between both ends of stopping hole 32, and cannot rotate over both ends of stopping hole 32. Consequently, it is fixed at both end portions of stopping hole 32.

Figure 6:
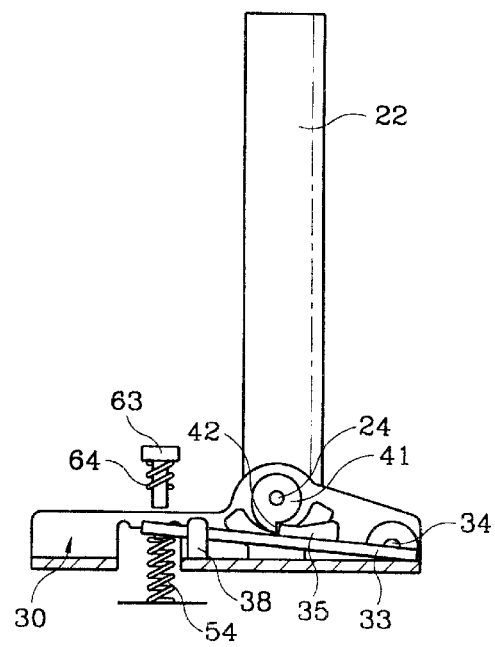
FIG. 6 is a right view illustrating a hinge connector for an LCD monitor according to the present invention.
Figure 7:
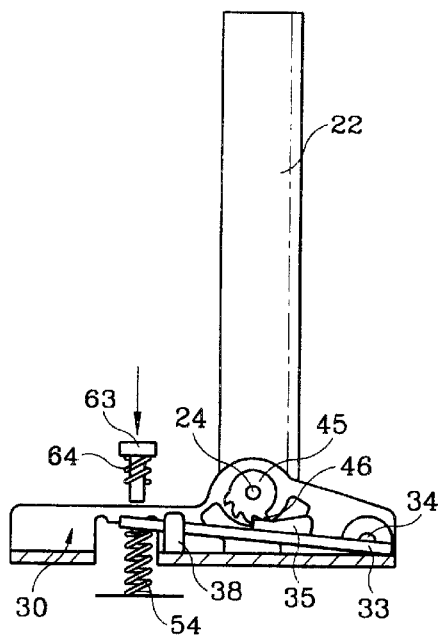
FIG. 7 is a right view illustrating a hinge connector for an LCD monitor according to another embodiment of the present invention.

As shown in FIG. 6, stop circular plate 41 has protruding cog 42 formed at a predetermined place. When protruding cog 42 is engaged with blocking protrusion 35 of blocking bar 33, stop circular plate 41 does not rotate and is fixed. If blocking bar 33 descends downward, protruding cog 42 is released from the fixed state and stop circular plate 41 can rotate freely. As shown in FIG. 7, illustrating another embodiment of stop circular plate 45, four protruding cogs 46 are formed on stop circular plate 45 and allow stop circular plate 45 to be fixed at a plurality of predetermined angles.

Two guide holes 132 and 133 are formed horizontally on wire holder 122 of multistage stand 20 and wire stand 123 can move in a straight line along guide holes 132 and 133. Connecting groove 134 is formed on the both ends and the center of wire holder 122 and is fixed to bottom stand 124 by a screw.

Wire stand 123 located under wire holder 122 comprises a front wire stand 136 moving frontward and a rear wire stand 135 moving rearward, which has a narrower width than front wire stand 136. Wire stand 123 has protuberance 140 formed at both end portions thereof. Protuberance 140 is inserted into and moves in a straight line along guide holes 132 and 133 of wire holder 122. Therefore, the space for supporting the stand unit can be enlarged or narrowed by folding wire stand 123 frontward and rearward.

Bottom stand 124 has guide rib grooves 137 and 138 formed over a surface thereof and guiding straightly wire stand 123. Front wire stand 136 is guided by an outside guide rib groove 138 and a rear wire stand 135 by an inside guide rib groove 137. Bottom stand 124 has plural connecting bosses 139 at both end portions of a surface thereof for fixing hinge connector 21 and wire holder 122 thereto, and has protuberance 155 formed at an end of the surface to which compressed spring 54 pushes upward the underside of the blocking bar. Inserting hole 152 formed on the underside of bottom stand 124 allows the bottom stand to be connected to top stand 60 by a screw and a foot 153 is inserted into the inserting hole to prevent stand unit 20 from sliding.

Top stand 60 has an aperture 61 formed at both ends thereof and a convex part 62 formed straightly from one aperture to the other. Convex part 62 allows rotating shaft 24 of hinge connector 21 to rotate easily. The top stand further comprises an aperture 66 formed at the front and rear sides thereof for the movement of wire stand 123.

A button hole 65 installing a compressed spring 64 therein is formed at an end portion of the upper surface. Push button 63 is installed in button hole 65, which can push downward blocking bar 33 of hinge connector 21. Accordingly, as shown in FIG. 6, when push button 63 is pushed, blocking bar 33 descends downward, and protruding cog 42 is released from the engagement and, consequently stop circular plate 41 can rotate.

Hereinafter, a multistage structure for an LCD monitor stand according to the present invention is described in detail referring to the accompanying drawings.

Figure 8:
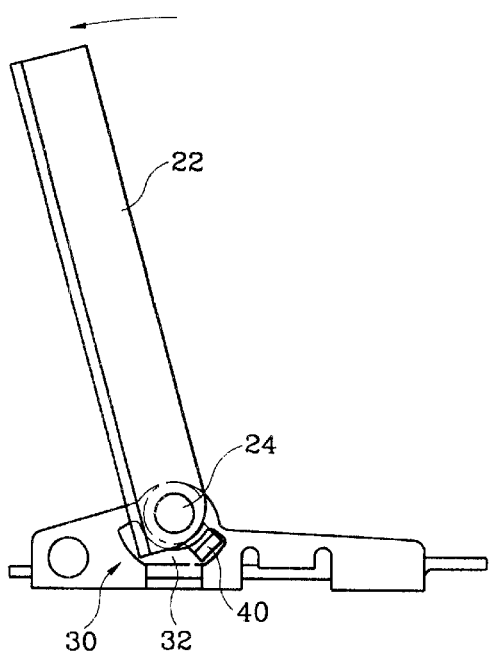
FIG. 8 is a left view illustrating an opened state of a hinge connector for an LCD monitor according to the present invention.

As shown in FIG. 3 to FIG. 14, if rotating bar 22 of hinge connector 21 connected to display unit 80 is pulled back, stop bar 40 inserted into stopping hole 32 of hinge connector 21 is stopped at an end portion of stopping hole 32. Accordingly, as shown in FIG. 8, rotating bar 22 connected to rear case 70 of display unit 80, is not rotated at a predetermined angle and is stopped at the maximum opened state.

Figure 9:
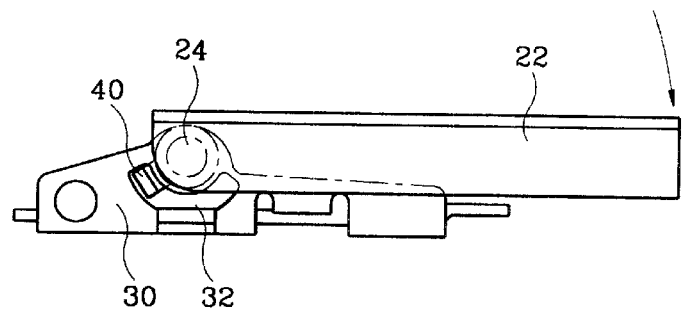
FIG. 9 is a left view illustrating a closed state of a hinge connector for an LCD monitor according to present invention.
Figure 10:
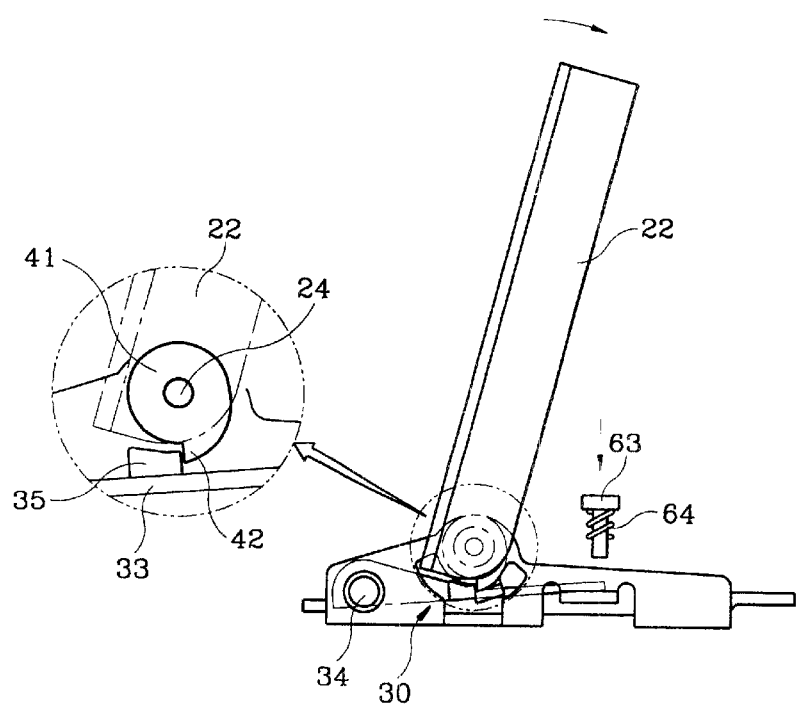
FIG. 10 is a left view illustrating a pulled state of a hinge connector for an LCD monitor according to the present invention.
Figure 11:
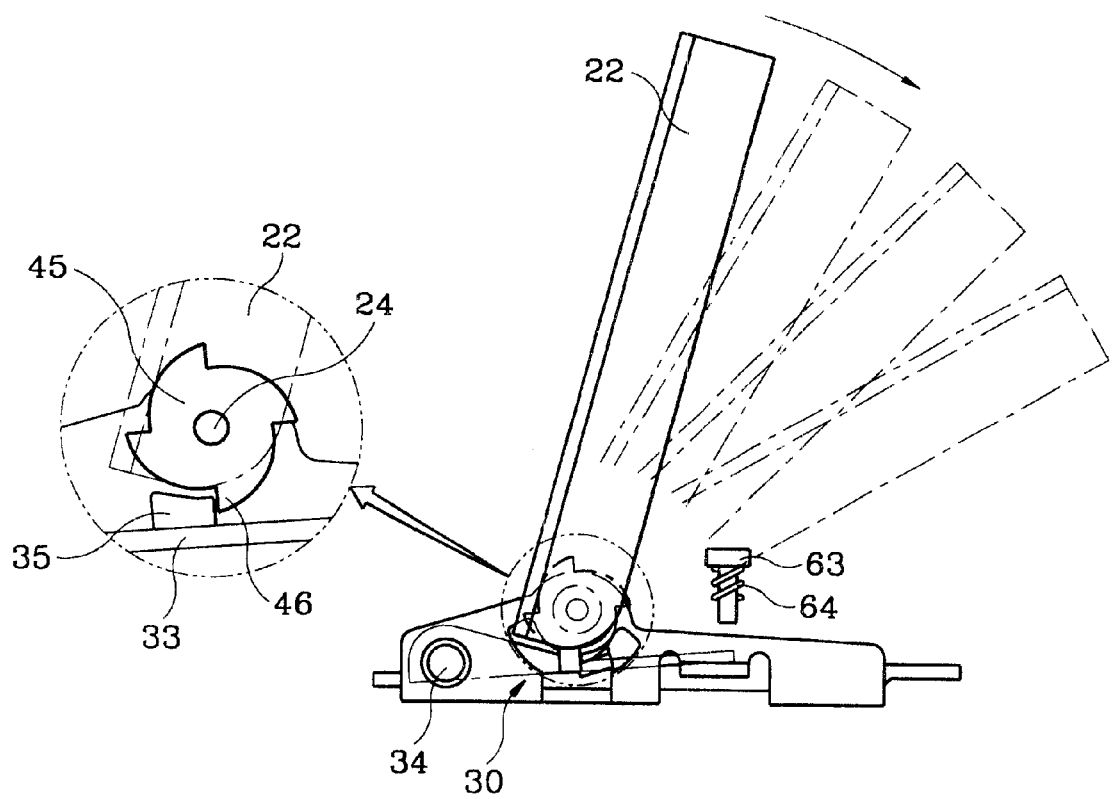
FIG. 11 is a left view illustrating a pulled state of a hinge connector for an LCD monitor according to another embodiment of the present invention.

As shown in FIG. 10, if rotating bar 22 is folded downward, rotating bar 22 is stopped by protruding cog 42 engaging with the blocking protrusion 35 of blocking bar 33. At this time, if push button 63 is pushed, blocking bar 33 and blocking protrusion 35 descend downward and protruding cog 42 is released from engagement. Consequently rotating bar 22 continues to be folded downward. As shown in FIG. 11, stop circular plate 45 having plural protruding cogs 46 can be fixed at various angles and can be released from engagement. Next, as shown in FIG. 9, stop bar 40 is inserted into stopping hole 32 of hinge connector 21 and is fixed at an end portion of stopping hole 32.

Figure 14:
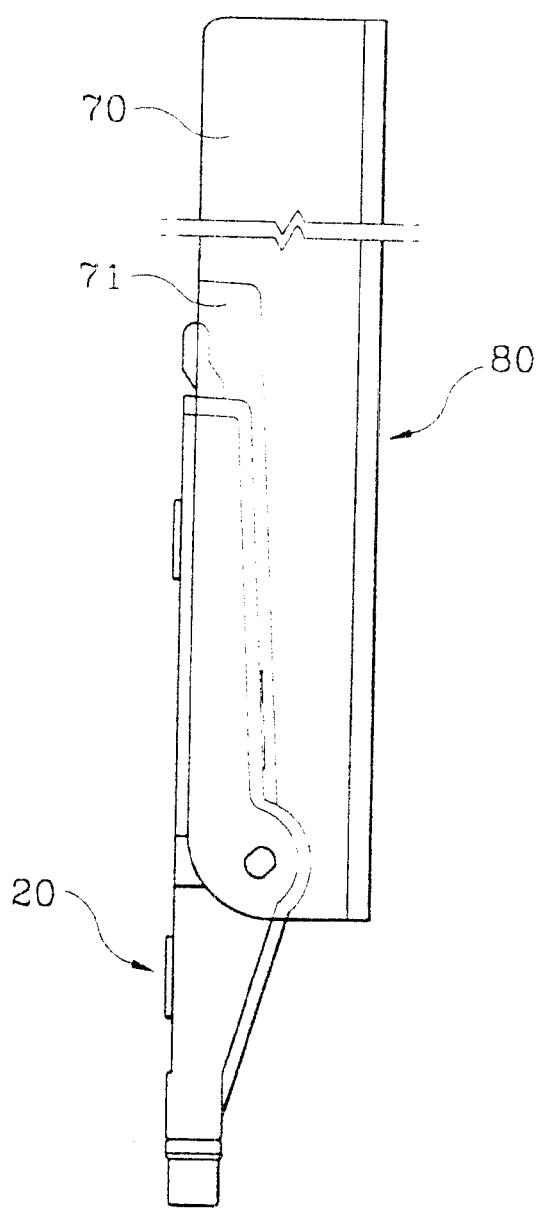
FIG. 14 is a left view illustrating a pulled state of an LCD monitor according to the present invention.

Accordingly, if display unit 80 is folded completely and horizontally with hinge connector 21, as shown in FIG. 14, the rear end part of stand 20 is received in receiving groove part 71 of rear case 70. Therefore, it is possible to hang an LCD monitor on a vertical surface such as the wall and to pack the same without separating display unit 80 from stand 20.

Figure 12:
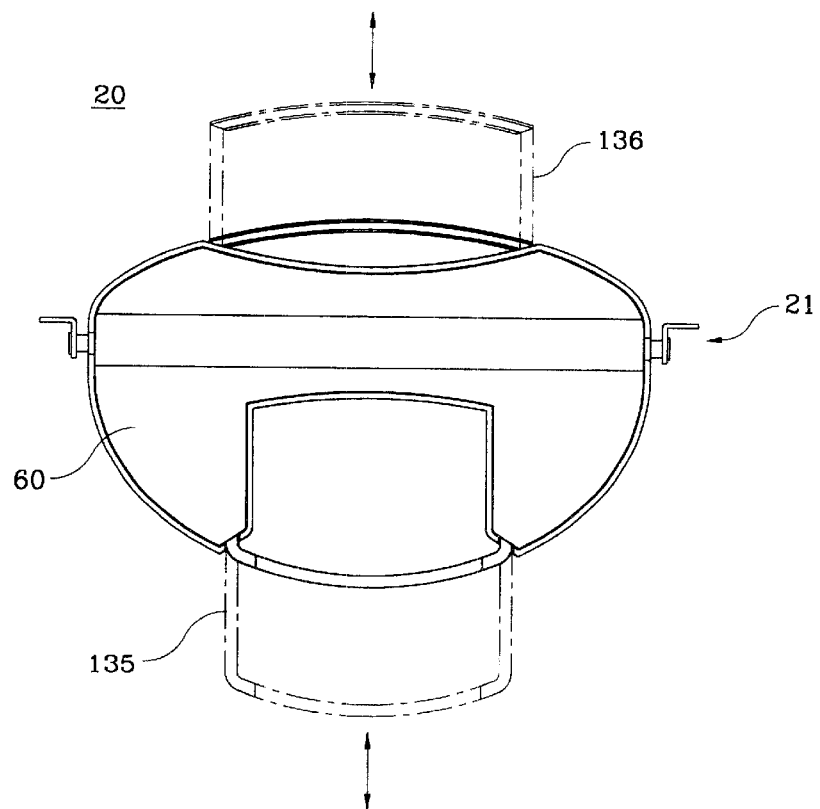
FIG. 12 is a plane figure illustrating how to fold a multistage stand for an LCD monitor according to the present invention.
Figure 13:
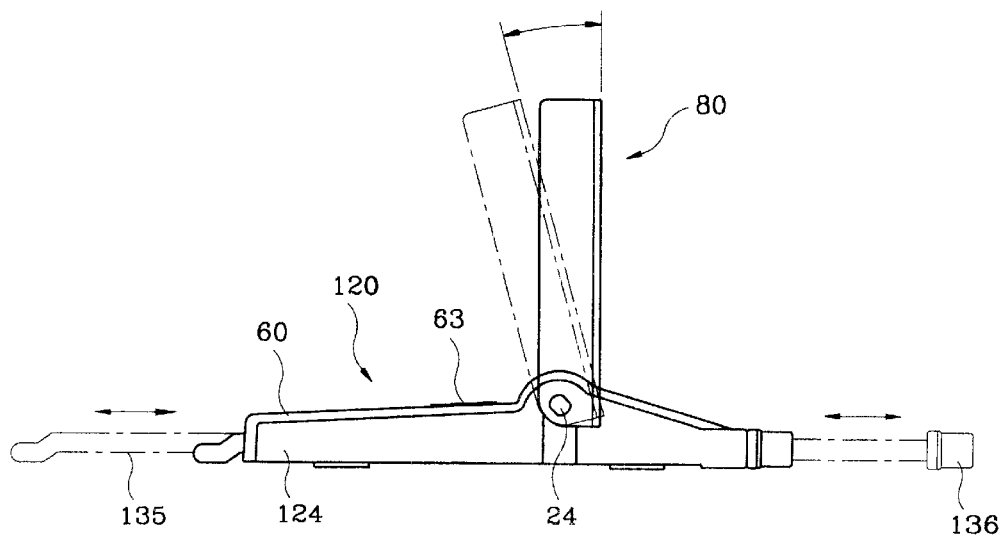
FIG. 13 is a side illustrating how to fold a multistage stand for an LCD monitor according to the present invention.

As shown in FIG. 12, if front wire stand 136 and rear wire stand 135 are pulled frontward and rearward, the supporting space of stand 20 is enlarged. Front and rear stands 135 and 136 are guided in a straight line by guide holes 132 and 133 of wire holder 122, and guide rib grooves 137 and 138 of bottom stand 24 and installed in stand 20, so that front and rear stands 135 and 136 can be folded into stand 20.

Accordingly, stand 20 can support display unit 80, minimizing the size thereof and the needed supporting space. It is also possible to hang display unit 80 vertically on the wall or to narrow the space of the installation by folding wire stands 135 and 136 into stand 20 when not used.

As described above, the multistage structure for an LCD monitor stand has the advantage of obtaining the best-suited view angle when the display unit is rotated upward and downward according to this multistage stopping method. It is also possible to hang an LCD monitor on the wall when it is folded completely and to pack it without separating the stand unit from the display unit. In addition, an LCD monitor can be supported stably in a minimum space by a minimum sized stand, and it is possible to decrease the space needed for installing and to decrease the cost.

Although the preferred embodiment of the present invention has been described, it will be understood by those skilled in the art that the present invention should not be limited to the described preferred embodiment, but various changes and modifications can be made within the spirit and scope of the invention as defined by the appended claims.

What is claimed is:

1. A liquid crystal display (LCD) monitor stand unit adapted for supporting a display unit including an LCD monitor, said monitor stand unit comprising:

a generally planar top stand and a generally planar bottom stand, adapted for supporting the display unit in cooperation with one another and with the monitor stand unit, said monitor stand unit, top stand, and bottom stand each having a right end portion and a left end portion;

a right hinge connector and a left hinge connector respectively installed at the right and left end portions of the monitor stand unit, said right and left hinge connectors adapted for permitting said display unit to be swung in a vertical plane normal to the planes of the top and bottom stands; and means for allowing the monitor stand unit to be opened and closed completely, when the display unit is swung in the vertical plane normal to the planes of the top and bottom stands, between a complete opening of the monitor stand unit and a complete closure thereof, respectively, and for allowing the display unit to be fixed and released at one or more positions between a complete opening of the monitor stand unit and a complete closure thereof, where a complete closure of the monitor stand unit occurs when the display unit is substantially coplanar to the top and bottom stands, and a complete opening occurs when the display unit is substantially perpendicular to the top and bottom stands.

2. A liquid crystal display (LCD) monitor stand unit adapted for supporting a display unit including an LCD monitor, said monitor stand unit comprising:

a generally planar top stand and a generally planar bottom stand, adapted for supporting the display unit in cooperation with one another and with the monitor stand unit, said monitor stand unit, top stand, and bottom stand each having a right end portion and a left end portion;

a right hinge connector and a left hinge connector respectively installed at the right and left end portions of the monitor stand unit, said right and left hinge connectors adapted for permitting said display unit to be rotated in a vertical plane normal to the monitor stand unit; and means for allowing the monitor stand unit to be opened and closed completely, when the display unit is swung in the vertical plane normal to the monitor stand unit, between a complete opening of the monitor stand unit and a complete closure thereof, respectively, and for allowing the display unit to be fixed and released at one or more positions between a complete opening of the monitor stand unit and a complete closure thereof, where a complete closure of the monitor stand unit occurs when the display unit is substantially coplanar to the top and bottom stands, and a complete opening occurs when the display unit is substantially perpendicular to the top and bottom stands;

wherein the hinge connectors are adapted to permit insertion of a back side of said stand unit into a receiving groove part of said display unit when the stand unit is closed, whereby the display unit is capable of being hung on a wall.

3. A liquid crystal display (LCD) monitor stand unit adapted for supporting a display unit including an LCD monitor, said monitor stand unit comprising:

a generally planar top stand and a generally planar bottom stand, adapted for supporting the display unit in cooperation with one another and with the monitor stand unit, said monitor stand unit, top stand and bottom stand each having a right end portion and a left end portion;

a right hinge connector and a left hinge connector respectively installed at the right and left end portions of the monitor stand unit, said right and left hinge connectors adapted for permitting said display unit to be swung in a vertical plane normal to the monitor stand unit; and means for allowing the monitor stand unit to be opened and closed completely, when the display unit is rotated in the vertical plane normal to the monitor stand unit, between a complete opening of the monitor stand unit and a complete closure thereof, respectively, and for allowing the display unit to be fixed and released at one or more positions between a complete opening of the monitor stand unit and a complete closure thereof, where a complete closure of the monitor stand unit occurs when the display unit is substantially coplanar to the top and bottom stands, and a complete opening occurs when the display unit is substantially perpendicular to the top and bottom stands;

wherein the hinge connectors comprise:

a longitudinally extended bracket having a generally L-shaped cross-section, said bracket comprising a horizontal plate and, normal thereto, a vertical plate, said vertical plate containing a shaft hole;

a rotatable shaft, normal to the vertical plate and passing through the shaft hole, said rotatable shaft having a proximal end and a distal end;

a rotating bar longitudinally extending normal to the rotatable shaft, said rotating bar attached at an end thereof to the rotatable shaft at the distal end thereof, said rotating bar adapted to be connected to said display unit;

a stopping hole forming a circular arc in the vertical plate of the bracket, located below said rotatable shaft; and a stop bar, said stop bar comprising means for causing the rotatable shaft to rotate only between first and second predetermined locations.

4. The LCD monitor stand unit of claim 3, wherein said stop bar comprises a vertical part connected to said rotatable shaft and a horizontal part, located at the lower portion of the vertical part and inserted into a circular arc groove of the bracket, whereby the rotatable shaft is rotatable only between a first end and a second end of the circular arc groove.

5. The LCD monitor stand unit of claim 3, wherein a stop circular plate is connected to the rotatable shaft and has at least one protruding cog protruding from an upper surface of the circular stop plate, said cog engaged with a blocking protrusion of a blocking bar, whereby the stop circular plate is rotatable only within a predetermined angle.

6. The LCD monitor stand unit of claim 5, wherein said blocking bar has a spring located at a lower part thereof and a push button located at an upper part thereof, whereby:

when the push button is pushed, the blocking bar moves downward and the protruding cog of the stop circular plate is released and becomes rotatable; and when the pushed push button is released, the blocking bar is returned to a previous position thereof by the spring and the stop circular plate becomes non-rotatable.

7. The LCD monitor stand unit of claim 1, wherein said monitor stand unit further comprises a wire stand unit extending to provide a supporting space, said wire stand unit adapted to slide forward and backward.

8. The LCD monitor stand unit of claim 7, wherein said wire stand unit comprises:

a front wire stand extended forward and having a front protuberance at an end thereof;

a rear wire stand extended rearward and having a rear protuberance at an end thereof; and located at an upper portion of the wire stand unit, a wire holder having a guide hole formed in a direction parallel to that in which the extension is formed, said guide hole adapted to receive a said protuberance, whereby the wire stand unit can be slided, respectively, toward the front and the rear of the stand unit.

9. A liquid crystal display (LCD) monitor stand unit adapted for supporting a LCD display unit, said monitor stand unit comprising:

a top stand and a bottom stand, adapted for supporting the display unit in cooperation with one another and with the monitor stand unit, said monitor stand unit, top stand, and bottom stand each having a right end portion and a left end portion;

a right hinge connector and a left hinge connector respectively installed at the right and left end portions of the monitor stand unit, said right and left hinge connectors adapted for permitting said display unit to be rotated in a vertical plane normal to the monitor stand unit, said hinge connectors each comprising:

a longitudinally extended bracket having a generally L-shaped cross-section, said bracket comprising a horizontal plate and, normal thereto, a vertical plate, said vertical plate containing a shaft hole;

a rotatable shaft, normal to the vertical plate and passing through the shaft hole, said rotatable shaft having a proximal end and a distal end, said rotatable shaft connected to a stop circular plate that has at least one cog protruding from an upper surface of the circular stop plate, said cog engaged with a blocking protrusion of a blocking bar, whereby the stop circular plate is rotatable only within a predetermined angle;

a rotating bar longitudinally extending normal to the rotatable shaft, said rotating bar attached at an end thereof to the rotatable shaft at the distal end thereof, said rotating bar adapted to be connected to said display unit;

a stopping hole forming a circular arc in the vertical plate of the bracket, located below said rotatable shaft; and a stop bar, said stop bar comprising means for causing the rotatable shaft to rotate only between first and second predetermined locations; and means for allowing the monitor stand unit to be opened and closed completely, when the display unit is rotated in the vertical plane normal to the monitor stand unit, between a complete opening of the monitor stand unit and a complete closure thereof, respectively, and for allowing the display unit to be fixed and released at one or more positions between a complete opening of the monitor stand unit and a complete closure thereof, where a complete closure of the monitor stand unit occurs when the display unit is substantially coplanar to the top and bottom stands, an a complete opening occurs when the display unit is substantially perpendicular to the top and bottom stands.

10. The LCD monitor stand unit of claim 9, wherein said blocking bar has a spring located at a lower part thereof and a push button located at an upper part thereof, whereby:

when the push button is pushed, the blocking bar moves downward and the protruding cog of the stop circular plate is released and becomes rotatable; and when the pushed push button is released, the blocking bar is returned to a previous position thereof by the spring and the stop circular plate becomes non-rotatable.

11. A method for supporting a liquid crystal display (LCD) monitor in a manner such that the LCD monitor can be fixed in any of a plurality of angular viewing positions, thereby permitting a user to select an optimum viewing angle for the LCD monitor, said method comprising the steps of:

(1) providing a monitor stand unit that comprises: a generally planar top stand and a generally planar bottom stand adapted for supporting a LCD display unit, said monitor stand unit comprising:

said top stand and said bottom stand adapted for supporting the display unit in cooperation with one another and with the monitor stand unit, said monitor stand unit, top stand, and bottom stand each having a right end portion and a left end portion;

a right hinge connector and a left hinge connector respectively installed at the right and left end portions of the display unit, said right and left binge connectors adapted for permitting said display unit to be rotated in a vertical plane normal to the monitor stand unit; and means for allowing the monitor stand unit to be opened and closed completely, when the display unit is rotated in the vertical plane normal to the monitor stand unit, between a complete opening of the monitor stand unit and a complete closure thereof, respectively, and for allowing the display unit to be fixed and released at one or more positions between a complete opening of the monitor stand unit and a complete closure thereof; and (2) placing an LCD monitor on the monitor stand unit of the monitor stand.

12. The method of claim 11, wherein the hinge connector of the monitor stand unit comprises:

a longitudinally extended bracket having a generally L-shaped cross-section, said bracket comprising a horizontal plate and, normal thereto, a vertical plate, said vertical plate containing a shaft hole;

a rotatable shaft, normal to the vertical plate and passing through the shaft hole, said rotatable shaft having a proximal end and a distal end;

a rotating bar longitudinally extending normal to the rotatable shaft, said rotating bar attached at an end thereof to the rotatable shaft at the distal end thereof, said rotating bar adapted to be connected to said display unit;

a stopping hole forming a circular arc in the vertical plate of the bracket, located below said rotatable shaft; and a stop bar, said stop bar comprising means for causing the rotatable shaft to rotate only between first and second predetermined locations.

13. The method of claim 12, wherein a stop circular plate is connected to the rotatable shaft of the monitor stand unit and has at least one protruding cog protruding from an upper surface of the circular stop plate, said cog engaged with a blocking protrusion of a blocking bar, whereby the stop circular plate is rotatable only within a predetermined angle.

* * * * *